United States Patent
Wiesenberg et al.

(10) Patent No.: US 11,447,149 B2
(45) Date of Patent: Sep. 20, 2022

(54) SYSTEMS AND METHODS FOR DETECTING AND ALERTING LOAD SEPARATION FROM A MOVING VEHICLE

(71) Applicant: Toyota Motor Engineering & Manufacturing North America, Inc., Plano, TX (US)

(72) Inventors: Ryan M. Wiesenberg, Ann Arbor, MI (US); Ethan W. Pomish, Livonia, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 75 days.

(21) Appl. No.: 17/164,463

(22) Filed: Feb. 1, 2021

(65) Prior Publication Data

US 2022/0242436 A1 Aug. 4, 2022

(51) Int. Cl.
- *B60W 50/16* (2020.01)
- *B62D 15/02* (2006.01)
- *B60W 30/18* (2012.01)
- *B60W 50/14* (2020.01)

(52) U.S. Cl.
CPC ...... *B60W 50/16* (2013.01); *B60W 30/18009* (2013.01); *B62D 15/02* (2013.01); *B60W 2050/143* (2013.01); *B60W 2510/1055* (2013.01)

(58) Field of Classification Search
CPC ............ B60W 50/16; B60W 30/1809; B60W 2050/143; B60W 2050/1055; B62D 15/02
See application file for complete search history.

(56) References Cited

U.S. PATENT DOCUMENTS

| 10,029,340 B2 | 7/2018 | Isobe |
| 10,166,980 B2 | 1/2019 | Fujii et al. |
| 2005/0134440 A1* | 6/2005 | Breed .................. G01S 17/931 |
| | | 701/45 |
| 2012/0239257 A1* | 9/2012 | Ichinose .................. G01C 7/04 |
| | | 701/124 |
| 2020/0255004 A1* | 8/2020 | Raichelgauz .......... G08G 1/166 |
| 2021/0056322 A1* | 2/2021 | Hasegawa ................ G06T 7/70 |

FOREIGN PATENT DOCUMENTS

| CN | 105752246 A | 7/2016 |
| DE | 102017207075 A1 | 10/2018 |
| DE | 102018211731 A1 | 3/2019 |
| JP | 3829067 B2 | 10/2006 |
| JP | 2007040788 A | 2/2007 |
| KR | 100622767 B1 | 9/2006 |

\* cited by examiner

*Primary Examiner* — Tan Q Nguyen
(74) *Attorney, Agent, or Firm* — Snell & Wilmer LLP (57) ABSTRACT

Systems and methods for detecting and issuing one or more safety measures if a person or an object has separated from a moving vehicle. The system may include at least one torque sensor coupled to the vehicle and configured to detect torque at a drivetrain of the vehicle. The system may further include at least one processor in electronic communication with the at least one torque sensor. The at least one processor may be configured to measure change in torque in real-time, where the change in time is directly proportional to a change in a mass of a load carried by the vehicle. The system may further include an alerting device controlled by the at least one processor. The alerting device may be configured to alert an operator of the vehicle when the change in torque exceeds a predetermined threshold value.

20 Claims, 6 Drawing Sheets

FIG. 6

SYSTEMS AND METHODS FOR DETECTING AND ALERTING LOAD SEPARATION FROM A MOVING VEHICLE

BACKGROUND

1. Field

The present disclosure is directed to systems and methods for detecting separation of an object or a person from a moving vehicle based on a change in torque and alerting an operator of the vehicle of the same.

2. Description of the Related Art

Operators or drivers of vehicles may carry cargo in or on various locations of the vehicles (e.g., trunks, truck beds, or on roof racks). Additionally, drivers may tow open or closed trailers, other vehicles, and mobile homes with their vehicles. Passengers, which can be humans or pets, may be transported in truck beds, trailers, and other areas of vehicles separated from the cabin, cockpit or driver's seat. While vehicles are being driven or in a stationary position, cargo, and in extreme cases, passengers may accidentally exit or fall out of the vehicle due to various conditions. For example, a truck or SUV may travel over a bumpy road and cargo or trailers may become unsecured or drivers may have to suddenly hit the brakes causing the cargo to fall from the truck bed. In such cases, drivers may not see or hear that their cargo, tow, or passenger has separated from their vehicle. Hence, drivers may not be able to retrieve the separated cargo and/or experience property damage, injury, and, in some cases, loss of the cargo.

As such, there is a need for a method and a system for detecting separation of an object or a person from a moving or stationary vehicle and alerting the vehicle driver of the same.

SUMMARY

Systems and methods for detecting and issuing one or more safety measures if load carried by the vehicle, including persons, pets, and objects, has separated from a moving vehicle. A system may include a torque sensor that can detect torque at a drivetrain of the vehicle. The system may further include a processor that can measure a change in torque in real-time based on torque sensor data, where the change in torque is directly proportional to a change in mass of the load. The system may further include an alerting device controlled by the processor that can alert a driver of the vehicle when the change in torque exceeds a predetermined threshold value.

In accordance with an embodiment of the present disclosure, there may be a system for detecting and issuing one or more safety measures if or when a load has separated from a moving vehicle. The system may have a torque sensor coupled to the vehicle. The torque sensor may be configured to detect torque at a drivetrain of the vehicle. The system may have a processor in electronic communication with the torque sensor. The processor may be configured to measure a change in torque in real-time. The change in torque may be directly proportional to a change in mass of the load carried by the vehicle. The system may have an alerting device controlled by the processor. The alerting device may be configured to alert an operator of the vehicle when the change in torque exceeds a predetermined threshold value. The alert may me a visual, audible, or haptic alert. The processor may be further configured to control a steering and a speed of the vehicle and pull over the vehicle when the change in torque exceeds the predetermined threshold value. The processor may be further configured to automatically turn on hazard lights of the vehicle when the vehicle is pulled over.

The system may further have an orientation sensor in electronic communication with the processor to detect an orientation of the vehicle so that the change in torque does not exceed the predetermined threshold value due to the orientation of the vehicle. The system may further have a traction sensor in electronic communication with the processor to detect a traction of the vehicle so that the change in torque does not exceed the predetermined threshold value due to the traction of the vehicle. The system may further have a location sensor in electronic communication with the processor to detect a location of the vehicle to verify the detected orientation and traction of the vehicle.

In accordance with an embodiment of the present disclosure, there may be a system for detecting a change of load mass and load mass distribution of a moving vehicle and issuing one or more safety measures based on the change of load mass and load mass distribution. The system may have a plurality of torque sensors distributed throughout the vehicle. The plurality of torque sensors may be configured to detect torque at a location on a drivetrain of the vehicle. The system may have a processor in electronic communication with the plurality of torque sensors. The at least one processor may be configured to measure a change in torque in real-time and measure a shift in torque between the plurality of torque sensors in real-time. The change in torque may be directly proportional to the change in load mass of the vehicle. The shift in torque between the plurality of torque sensors may be directly proportional to the change in load mass distribution of the vehicle. The system may have an alerting device controlled by the processor. The alerting device may be configured to alert an operator of the vehicle when the change in torque exceeds a first predetermined threshold value and the shift in torque between the plurality of torque sensors exceeds a second predetermined threshold value. The alert may be visual, audible, or haptic alert. The at least one processor may be further configured to control a steering and an acceleration of the vehicle and pull over the vehicle when the change in torque exceeds the first predetermined threshold value. The processor may be further configured to automatically turn on hazard lights of the vehicle when the vehicle is pulled over.

The system may further have an orientation sensor in electronic communication with the processor to detect an orientation of the vehicle so that the change in torque does not exceed the first predetermined threshold value or the shift in torque does not exceed the second predetermined threshold value due to the orientation of the vehicle. The system may further have a traction sensor in electronic communication with the processor to detect a traction of the vehicle so that the change in torque does not exceed the first predetermined threshold value or the shift in torque does not exceed the second predetermined threshold value due to the traction of the vehicle. The system may further have a location sensor in electronic communication with the processor to detect a location of the vehicle to verify the detected orientation and traction of the vehicle. The plurality of torque sensors may include a first torque sensor located on a front axle of the vehicle. The plurality of torque sensors may include a second torque sensor located on a rear axle of the vehicle.

In accordance with an embodiment of the present disclosure, there may be a method for detecting and issuing one or more safety measures if a passenger or an object has separated from a moving vehicle. The method may include detecting a torque at a drivetrain of the vehicle via a torque sensor at one or more locations. The method may further include measuring a change in torque in real-time via a processor in electronic communication with one or more torque sensors. The change in torque may be directly proportional to a change in a mass of a load carried by the vehicle. The method may further include alerting an operator of the vehicle when the change in the torque exceeds a predetermined threshold value via an alerting device controlled by the processor. The predetermined threshold value may account for a mass of consumables and a rate of consumption of the consumables by the vehicle to not issue an alert due to a change of torque based on the consumable consumption. The alert may be a visual, audible, or haptic alert. The method may further include pulling over the vehicle when the change in torque exceeds the predetermined threshold value via the processor, which is further configured to control a steering and an acceleration of the vehicle. The method may further include automatically turning on the hazard lights of the vehicle when the vehicle is pulled over via the processor.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The systems and methods described herein detect and alert a driver of a vehicle when a load carried by the vehicle separates from the vehicle. The load may be passengers (e.g., persons, pets, etc.) and/or objects (e.g., cargo, trailer, other vehicles). The systems may be integrated with the vehicle. The system may include a variety of sensors (e.g., orientation, location, traction) to prevent false alerts. The alert may advantageously and quickly warn the driver of any separation of the load from the vehicle so that the driver can act on it swiftly rather than notice that passengers and/or objects were separated from the vehicle with delay or not noticing it at all. Hence, the alert may help the driver avoid or mitigate a loss of property, life, or injury to passengers.

In autonomous and semi-autonomous vehicles with self-driving capabilities, the system may safely pull over the vehicle to the side of the road and turn on hazard lights to advantageously ensure passenger safety if the driver is unavailable or not paying attention as well as allow the driver to ensure the safety of passengers and retrieve fallen or separated items. In systems with multiple torque sensors, there may be a torque sensor on each axle of the vehicle. The distribution of multiple torque sensors across the drivetrain of the vehicle may advantageously allow the system to detect weights shifts and identify loose passengers and/or objects moving unwantedly in or on the vehicle.

An exemplary system may include a torque sensor that can detect torque at a drivetrain of the vehicle. The system may further include a processor that can measure a change in torque in real-time based on torque sensor data, where the change in torque is directly proportional to a change in a mass of the load. The system may further include an alerting device controlled by the processor that can alert a driver of the vehicle when the change in torque exceeds a predetermined threshold value. The alert may be visual (e.g., icon, writing, or light on dashboard or infotainment unit), audible (e.g., beep or voice projected through sound system), or haptic (e.g., vibration on the steering wheel or the driver's seat).

Figure 1:
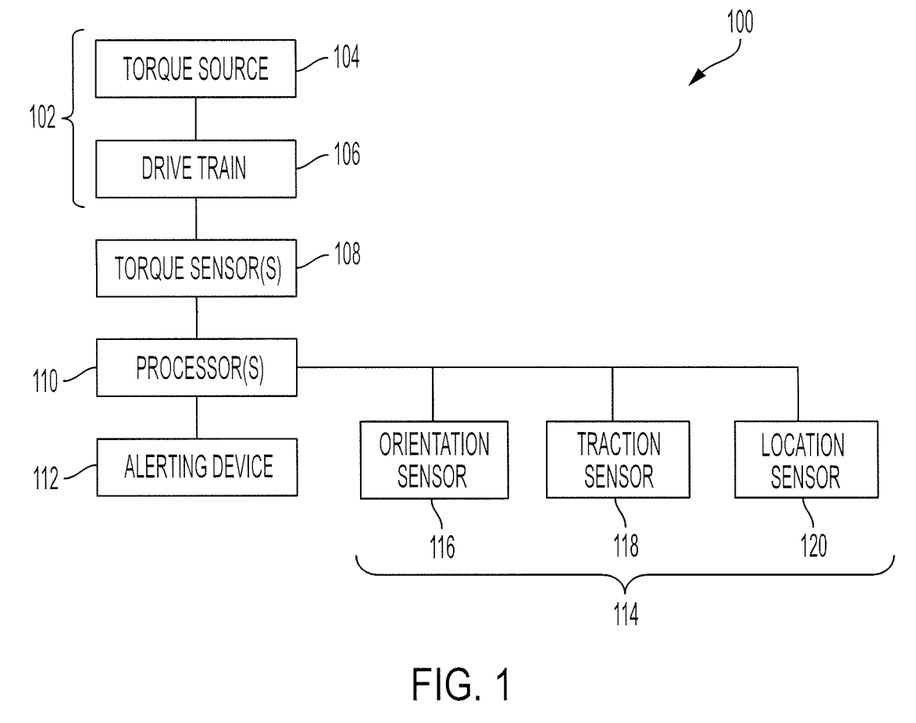
FIG. 1 illustrates a block diagram of a system for detecting and alerting a driver of a vehicle if a load has separated from the moving vehicle according to an aspect of the present disclosure.

FIG. 1 illustrates a block diagram of a system 100 for detecting and alerting a driver of a vehicle if a load has separated from the moving vehicle or a stationary vehicle according to an aspect of the present disclosure. The system 100 may include a powertrain 102 of the vehicle. The powertrain 102 may include a torque source 104 and a drivetrain 106 of the vehicle. The torque source 104 may provide torque to the drivetrain 106 to propel the vehicle. Torque is a twisting force generated by the torque source 104, which may be an internal combustion engine or an electric motor. The drivetrain 106 transmits torque from the torque source 104 to wheels of the vehicle. The drivetrain 106 includes a transmission. The transmission transmits torque from the torque source 104 (e.g., crankshaft of an engine) to a drive shaft of the drivetrain 106. The drive shaft then transmits torque to a differential along the drivetrain 106 between two wheels and the differential transfers torque to the wheels, causing the wheels to spin, which in turn moves the vehicle.

The system 100 may include one or more torque sensors 108. Torque sensors 108 may be rotational (i.e., rotary, dynamic) torque sensors. Rotational torque sensors may measure torque at the torque source 104 or along the drivetrain 106. By example and not limitation, locations of the torque sensors 108 may include an engine output shaft, a transmission output shaft, a front axle, and a rear axle of the vehicle as well as an electric motor of an electric vehicle. The torque sensors 108 may each be at the same location or at different locations. For example, there may be a torque sensor 108 coupled to the front axle and a torque sensor 108 coupled to the rear axle of the vehicle. Rotational torque sensors measure the torque produced by the torque source 104 in response to load applied to the rotating drive shaft. Rotational torque sensors may feature a slip ring or wireless communication with one or more processors 110 to transmit torque signal while rotating. The one or more processors 110 can be one or more electronic control units (ECUs). The term processor can be interchanged with the term ECU throughout this disclosure. A slip ring is an electrical connector that can carry current or signal between a stationary wire and a rotating torque sensor 108. By example and not limitation, wireless communication technologies utilized between the torque sensor 108 and the processor 110 may include infrared (IR), radio frequency (RF), Bluetooth, and Wi-Fi.

The processor 110 may receive torque data from the torque sensors 108 in real-time and monitor the torque data to determine whether a sudden change in torque has occurred. In some embodiments, the processor 110 may compare each new torque reading with a base torque measurement of the loaded vehicle. The base torque measurement may be torque detected by the torque sensors 108 in various steady state conditions. For example, the base torque may be measured when the vehicle is not accelerating or the acceleration is nearly zero. The base torque value may also be derived from an estimate of the torque at the drivetrain 106. For example, the estimated torque may be based on an estimated engine torque, although the torque sensors 108 may provide greater accuracy and thus be more preferable. In some embodiments, the processor 110 may compare each new torque reading with a torque reading taken immediately prior to the new torque reading. In some embodiments, the processor 110 may compare each new torque reading with an average of some or all torque readings prior to the new torque reading. A sudden change in torque may indicate a sudden change in the mass of the vehicle. The change in torque may be directly proportional to the change in the mass of the vehicle. The relationship between the mass and the torque regarding a vehicle may be demonstrated by the following equation:

$$M_V = \frac{R\varepsilon}{r} \frac{(T_D - T_{DR})}{A_v} = M_I$$

In the above equation, $M_V$ is the effective mass of the vehicle and includes a mass of the vehicle and the load on the vehicle (e.g., persons, pets, cargo, trailer). $M_I$ stands for the inertial effects of rotating components within the driveline of the drivetrain 106 that affect translational motion, which can be identified at each gear ration, accounting for the inertia of the rotating components. $A_v$ is the acceleration of the vehicle, which may be measured via an accelerometer. $T_D$ is torque transmitted by the drivetrain 106, which may be measured by the torque sensors 108. $T_{DR}$ is the torque when acceleration is at or near zero. $T_{DR}$ may be measured under steady state conditions either in real-time or during vehicle development at various speeds. R is an overall torque ratio between the location of the torque measurement and an axle. $\varepsilon$ is driveline efficiency observable for a given driveline. r stands for wheel radius. R and r may be determined based on the design geometry of the drivetrain 106.

Per the relationship established through the equation, when torque at the drivetrain 106 suddenly drops, the processor 110 may deduce or determine that the mass of the vehicle has suddenly dropped. A sudden drop in the mass of the vehicle may indicate that a passenger or an object has separated from the vehicle. When the processor 110 determines that the mass of the vehicle has suddenly dropped, the processor 110 may communicate with an alerting device 112 to alert the driver or operator of the vehicle. The alert may indicate to the driver or the passenger the contents of what has dropped (e.g., a sofa has dropped), the side of the vehicle that the drop occurred (e.g., a right side of the vehicle), and details as to what to do (e.g., how to turn around or where to stop the vehicle).

In some embodiments, the alerting device 112 may provide a visual alert. For example, the alert may be an icon, a light, or writing, which may be flashing, that appears on the dashboard, the infotainment unit, and the rear-view mirror, or is projected onto the windshield. In some embodiments, the alerting device 112 may provide an audible alert. For example, the alert may be a beeping sound or words spoken by a prerecorded voice assistant projected through the sound system of the vehicle. In some embodiments, the alerting device 112 may provide a haptic alert. For example, the alert may be a vibration the driver may feel through the steering wheel, the driver seat, or the gear shift knob or paddle shifters of the vehicle.

In order to mitigate false alerts, the system 100 may have various measures in place. In some embodiments, the processor 110 may initiate the alerting device 112 only when the change in torque exceeds a predetermined threshold value. Hence, the sudden drop in torque must be more than the predetermined threshold value for the driver to be alerted. In some embodiments, the processor 110 may initiate the alerting device 112 when the change in torque is equal to or greater than the predetermined threshold value. The predetermined threshold value may be determined such that changes in torque due to factors other than separation of mass from the vehicle do not trigger the alerting device 112.

The predetermined threshold value may be determined using the previously mentioned equation that establishes the relationship between the torque at the drivetrain 106 and effective vehicle mass. $T_D$ change that results when $M_V$ is decreased by a certain value may be stored by the system 100. For example, $T_D$ change when $M_V$ is decreased by five pounds (5 lbs.) may be the predetermined threshold value in a minimum tolerance system 100 that can detect a small object, an infant, or a pet separating from the vehicle. At this setting, the system 100 may, for example, alert the driver when an object or pet being carried in a truck bed or an open-top convertible is separated from the vehicle. Further, at this setting, the system 100 may alert the driver when a vehicle part disconnects from the vehicle, for example, a hub cap. In another example, $T_D$ change when $M_V$ is decreased by fifty pounds (50 lbs.) may be the predetermined threshold value in an intermediate tolerance system 100 that can detect cargo or a person separating from the vehicle. In another example, $T_D$ change when $M_V$ is decreased by a thousand pounds (1,000 lbs.) may be the predetermined threshold value in a maximum tolerance system 100 that can detect a trailer or another vehicle being towed separating from the vehicle. In some embodiments, other predetermined threshold values in between or outside the values given as examples may be picked based on the desired alert sensitivity of the system 100.

The system 100 may factor in consumables being used up and expelled by the vehicle into the equation in determining the predetermined threshold value. For example, windshield wiper fluid and gasoline may be examples of a consumable that is gradually expelled from the vehicle during vehicle operation. The processor 110 may account for the rate of consumption of such consumables and add an instantaneous change in mass due to consumption into the equation, and, as a result, increase the predetermined threshold value tolerance. In some embodiments, the processor 110 may add the change in torque due to the consumables being consumed back to the measured torque at the drivetrain 106 to cancel out its effects on the change in torque.

The system 100 may include one or more error mitigation sensors 114. The error mitigation sensors 114 may be in communication with the processor 110. The error mitigation sensors 114 may include an orientation sensor 116. The orientation sensor 116 may be an inertial measurement unit. The inertial measurement unit may measure the vehicle's orientation using a combination of accelerometers, gyroscopes, and/or magnetometers. The orientation data may affect torque at the drivetrain 106. Hence, the predetermined threshold value may also change based on a change in the torque due to the vehicle orientation. For example, if the vehicle is being driven uphill, the torque may increase. When this happens, the orientation sensor 116 may communicate the orientation data with the processor 110 and the processor 110 may decrease the predetermined threshold value by the increase in torque due to the vehicle orientation. In some embodiments, the processor 110 may subtract the change in torque due to the vehicle orientation from the measured torque at the drivetrain 106 to cancel out its effects on the change in torque.

The error mitigation sensors 114 may include one or more traction sensors 118. The traction sensors 118 may be wheel-speed sensors. The wheel-speed sensors may sense when one drive wheel is spinning faster than the others, meaning the vehicle is slipping or losing traction. Loss of traction may change the torque at the drivetrain 106. Hence, the predetermined threshold value may also change based on the change in torque due to the vehicle traction. For example, if the vehicle is being driven on slippery terrain in rainy conditions, the torque may decrease. When this happens, the traction sensors 118 may communicate the traction data with the processor 110, and the processor 110 may increase the predetermined threshold value by the decrease in torque due to the loss of traction. In some embodiments, the processor 110 may add the change in torque due to the loss of traction to the measured torque at the drivetrain 106 to cancel out its effects on the change in torque.

The error mitigation sensors may include a location sensor 120. The location sensor 120 may be a global positioning system (GPS). The location sensor 120 may provide location and map data. The vehicle's location may affect the torque at the drivetrain 106. For example, if the vehicle is being driven off a paved road or up a hill, the torque will change. By knowing the location of the vehicle, the system 100 can determine and/or verify that the vehicle is being driven under torque changing conditions. Hence, the location sensor 120 may supplement data from the orientation sensor 116 and the traction sensor 118 by providing extra information as to the driving conditions. For example, when the orientation sensor 116 picks up an increase in vehicle angle, the location sensor 120 can verify that the vehicle is in fact being driven uphill. In another example, when the traction sensor 118 detects tire slippage, the location sensor 120 can verify that the vehicle is being driven on slippery terrain such as sand or an icy road. As such, any modification to the predetermined threshold value or the change in torque at the drivetrain 106 being compared to the predetermined threshold value due to data from the orientation sensor 116 and/or the traction sensor 118 may be more accurate with the location sensor 120. As a result, alerts from the system 100 may be more accurate.

In some embodiments, when at least two torque sensors 108 are distributed on the vehicle's drivetrain 106, the system 100 may also detect a shift in the torque at the drivetrain 106 between the at least two torque sensors 108 and alert the driver via the alerting device 112 that a passenger or an object in or on the vehicle has become loose or dislodged. For example, a strapped down object in the truck or on the roof rack may have gotten loose and needs a readjustment and tightening of the straps. In another example, passengers in a trailer being towed by a vehicle may be moving unwantedly due to rough driving or road conditions and the driver may have to change his driving style or check up on the passengers to make sure they are fastened with their seat belts or secured in a safe place.

In some embodiments, one or more torque sensors 108 may be on the front axle of the drivetrain 106 and one or more torque sensors 108 may be on the rear axle of the drivetrain 106. A shift in the torque readings at the drivetrain 106 between the torque sensors 108 at the front axle and the rear axle may be directly proportional to a change in the load mass distribution on the vehicle. For example, if an object comes loose and longitudinally moves forward on the roof rack, an increase in the torque reading of the torque sensor 108 on the front axle and a decrease in torque reading of the torque sensor 108 on the rear axle is observed. If the object comes loose and longitudinally moves backward on the roof rack, a decrease in torque reading of the torque sensor 108 on the front axle and an increase in torque reading of the torque sensor 108 on the rear axle is observed. In embodiments where more than one torque sensor 108 is on each axle of the drivetrain 106, lateral movement of load may also be detected based on a shift in the torque between the left and right torque sensors 108.

The processor 110 may detect a shift in the torque at the drivetrain 106 and alert the driver via the alerting device 112. The alert for when a passenger or an object is loose or dislodged may be different than when a passenger or an object is separated entirely from the vehicle. For example, alert for the shift may be a different light, icon, or phrase that appears on the dashboard or the infotainment unit of the vehicle than an alert for the separation. In another example, an alert for the shift may be visual while an alert for the separation may be auditory or vice versa.

The system 100 may utilize the same measures in place for mitigating false alerts for separation in mitigating false alerts for unwanted movement. In some embodiments, the processor 110 may initiate the alerting device 112 only when the shift in torque exceeds a predetermined threshold value. The predetermined threshold value may be determined such that shifts in the torque due to factors other than a passenger or an object coming loose do not trigger the alerting device 112. The predetermined threshold value may be set using the same methodology as setting a predetermined threshold value for separation. The system 100 may again be a minimum, intermediate, or maximum tolerance system 100 in alerting shifts in load distribution to meet the driver's needs.

Figure 2:
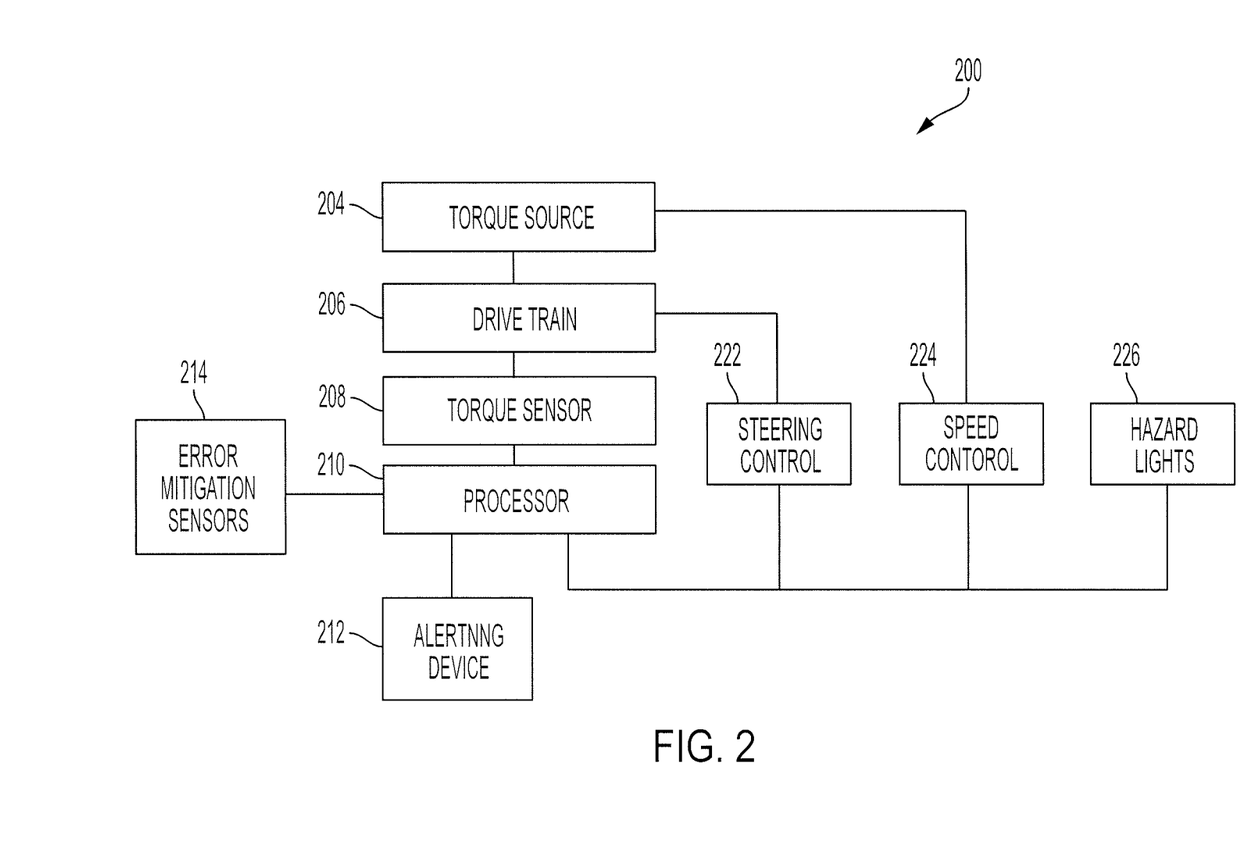
FIG. 2 illustrates a block diagram of a system for detecting and alerting a driver of a vehicle and safely pulling over the vehicle if a load has separated from the moving vehicle according to an aspect of the present disclosure.

FIG. 2 illustrates a block diagram of a system 200 for detecting and alerting a driver of a vehicle and safely pulling over the vehicle if the load has separated from the moving vehicle according to an aspect of the present disclosure. The system 200 may have the same or similar specifications and principles of operation as the system 100 of FIG. 1 except the system 200 may also pull over the vehicle when the change in torque exceeds a predetermined threshold value and/or the shift in torque exceeds a predetermined threshold value in autonomous and semi-autonomous vehicles. In some embodiments, the predetermined threshold values for pulling over the vehicle may be greater than the predetermined threshold values for alerting the driver. For example, the system 200 may only pull over the vehicle if the change in torque at the drivetrain 206 detected by the torque sensors 208 indicates a mass loss of greater than fifty pounds (50 lbs.), or the mass of an animal, a trailer, or a rooftop cargo carrier. Similarly, the system 200 may only pull over the vehicle if the shift in torque between the two or more torque sensors 208 at the drivetrain 206 indicates a mass shift of greater than fifty pounds (50 lbs.). The system 200 may have error mitigation sensors 214 that have the same specifications and principles of operation as the error mitigation sensors 114 of the system 100 of FIG. 1 to mitigate false pullovers. By pulling over the vehicle, the system 200 may ensure safety of the passengers if the driver is incapacitated to do so or allow the driver to have an opportunity to safely inspect the passengers and the vehicle. The system 200 may automatically turn on hazard lights 226 to ensure further safety. The processor 210 may issue an alert via the alerting device 212 prior to having the vehicle pull over to inform the driver and any passengers.

The system 200 may have a steering control unit 222 and a speed control unit 224 to pull the vehicle over safely when a triggering separation or unwanted movement occurs. A variety of sensors, including a camera, a radar, and a lidar working together may provide the processor 210 with information on the surroundings of the vehicle, such as speed, distance, and shape of nearby objects. The processor 210 may analyze the information and communicate with the steering control unit 222 and the speed control unit 224 to pull over the vehicle when it is safe to do so. Through the sensors that sense the surroundings of the vehicle, the processor 210 may determine whether it is safer to pull over to the right or the left. For example, if the vehicle is on the leftmost lane and right lanes are busy, the processor 210 may determine that pulling over to the left is safer and relay that information to the steering control unit 222. The steering control unit 222 may have a second pinion connected to a rack and pinion steering system of the drivetrain 206 actuated by a servo motor controlled by the processor 210 that steers the vehicle when self-driving is desired. In pulling over and coming to a full stop to park the vehicle on the side of the road, the processor 210 may communicate with the speed control unit 224 upon processing information from the surrounding sensing sensors. The speed control unit 224 may then communicate with the torque source 204 and the brakes to reduce and eventually cut speed. The speed control unit 224 may be an adaptive cruise control (ACC) system. The ACC may react to vehicles around the vehicle and change speed when safety dictates so until the vehicle is pulled over and comes to a full stop.

Figure 3:
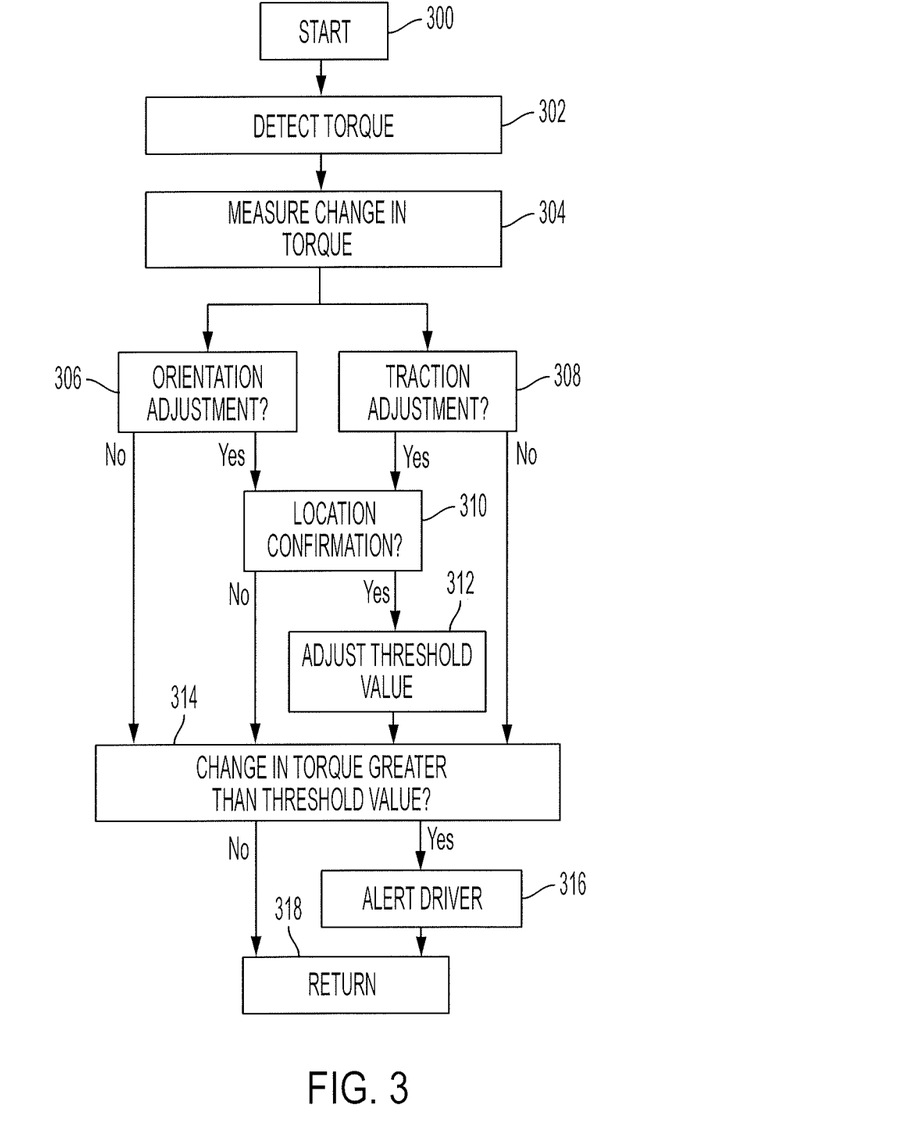
FIG. 3 illustrates a flow chart of a method for detecting and alerting a driver of a vehicle if a load has separated from the moving vehicle according to an aspect of the present disclosure.

FIG. 3 illustrates a flow chart of a method or process for detecting and alerting a driver of a vehicle if the load has separated from the moving vehicle according to an aspect of the present disclosure. The process may be performed with the system 100 (e.g., the processor and/or sensors) of FIG. 1. In block 300, the process may be initiated to detect a change in torque at the drivetrain 106 via one or more torque sensors 108, determine if the change in torque exceeds a predetermined threshold value via one or more processors 110, and alert the driver via an alerting device 112. The process may continue with block 302.

In block 302, the process may detect torque transmitted by the torque source 104 at the drivetrain 106 via the torque sensors 108. The torque sensors 108 may be rotational (i.e., rotary, dynamic) torque sensors. The rotational torque sensors measure torque at the torque source 104 or along the drivetrain 106. The torque sensors 108 may each be at the same location or at different locations. The rotational torque sensors measure the torque produced by the torque source 104 in response to a load applied to the rotating drive shaft. The rotational torque sensors may feature a slip ring or wireless communication with one or more processors 110 to transmit a torque signal while rotating. In some embodiments, wireless communication technologies utilized between the torque sensor 108 and the processor 110 may include infrared (IR), radio frequency (RF), Bluetooth, and Wi-Fi. The process may continue with block 304.

In block 304, the process may measure a change in torque at the drivetrain 106 from the received torque data from the torque sensors 108 in real-time via the processor 110. In some embodiments, the processor 110 may compare each new torque reading with a base torque measurement of the loaded vehicle. The base torque measurement may be torque detected by the torque sensors 108 in various steady state conditions. For example, the base torque may be measured when the vehicle is not accelerating or the acceleration is nearly zero. The base torque value may also be derived from an estimate of the torque at the drivetrain 106. For example, the estimated torque may be based on an estimated engine torque, although the torque sensors 108 may provide greater accuracy and thus be more preferable. In some embodiments, the processor 110 may compare each new torque reading with a torque reading taken immediately prior to the new torque reading. In some embodiments, the processor 110 may compare each new torque reading with an average of some or all torque readings prior to the new torque reading. A sudden change in torque may indicate a sudden change in a mass of the vehicle. The change in the torque may be directly proportional to the change in mass. The process may continue with blocks 306 and 308.

In block 306, the process may determine whether the measured change in torque or a predetermined threshold value to be compared with the measured torque must be adjusted to mitigate an error caused by the vehicle orientation. The system 100 may have an orientation sensor 116. The orientation sensor 116 may be an inertial measurement unit. The inertial measurement unit may measure the vehicle's orientation using a combination of accelerometers, gyroscopes, and/or magnetometers. The orientation data may affect torque at the drivetrain 106. Hence, the predetermined threshold value may also change based on a change in torque due to the vehicle orientation. When this happens, the orientation sensor 116 may communicate the orientation data with the processor 110, and the processor 110 may decrease the predetermined threshold value by the increase in torque due to the vehicle orientation. In some embodiments, the process may perform a verification that the change in torque is affected by the vehicle orientation via the location data in block 310 prior to adjusting the predetermined threshold value in block 312. In some embodiments, the processor 110 may subtract the change in torque due to the vehicle orientation from the measured torque at the drivetrain 106 to cancel out its effects on the change in torque. In some embodiments, the process may perform a verification that the change in torque is affected by the vehicle orientation via the location data in block 310 prior to having the processor 110 subtract the change in torque due to the vehicle orientation from the measured torque.

In block 308, the process may simultaneously determine whether the measured change in torque or a predetermined threshold value to be compared with the measured torque must be adjusted to mitigate an error caused by the vehicle traction. The system 100 may have traction sensors 118. The traction sensors 118 may be wheel-speed sensors. The wheel-speed sensors may sense when one drive wheel is spinning faster than the others, meaning the vehicle is slipping or losing traction. Loss of traction may change the torque at the drivetrain 106. Hence, the predetermined threshold value may also change based on the change in torque due to the vehicle traction. When this happens, the traction sensors 118 may communicate the traction data with the processor 110, and the processor 110 may increase the predetermined threshold value by a decrease in torque due to a loss of traction. In some embodiments, the process may perform a verification that the change in torque is affected by the traction via the location data in block 310 prior to adjusting the predetermined threshold value in block 312. In some embodiments, the processor 110 may add the change in torque due to a loss of traction to the measured torque at the drivetrain 106 to cancel out its effects on a change in torque. In some embodiments, the process may perform a verification that the change in torque is affected by the vehicle orientation via the location data in block 310 prior to having the processor 110 add the change in torque due to a loss of traction to the measured torque.

In block 310, the process may provide an extra layer of accuracy of orientation and traction data by cross-checking the orientation and traction data with location and map data obtained from a location sensor 120. If the process made an orientation-based adjustment in block 306 or a traction-based adjustment in block 308, the process may determine and/or verify that the vehicle is in fact being driven under torque changing conditions. As such, any modification to the predetermined threshold value or the change in torque at drivetrain 106 being compared to the predetermined threshold value due to data from the orientation sensor 116 or the traction sensor 118 may be double checked with the location sensor 120. If no orientation-based adjustment occurs in block 306 and no traction-based adjustment occurs in block 308, the process may move directly to block 314 and skip block 310. In some embodiments, if no orientation-based adjustment occurs in block 306 and no traction-based adjustment occurs in block 308, the process may still go through block 310 and confirm that no orientation-based or traction-based adjustment is warranted using the location and map data. The process may continue with block 312.

In block 312, the process may adjust the predetermined threshold value based on the orientation and/or traction data following location confirmation. The orientation sensor 116 may communicate the orientation data with the processor 110, and the processor 110 may decrease the predetermined threshold value by the increase in torque due to the vehicle orientation. The traction sensors 118 may communicate the traction data with the processor 110, and the processor 110 may increase the predetermined threshold value by the decrease in torque due to the loss of traction. The process may factor in consumables being used up and expelled by the vehicle into the equation in determining the predetermined threshold value. The processor 110 may account for the rate of consumption of such consumables and add instantaneous change in mass due to consumption into the equation, and, as a result, increase the predetermined threshold value. In some embodiments, the processor 110 may add the change in torque due to the consumables being consumed back to the measured torque at the drivetrain 106 to cancel out its effects on the change in torque.

In block 314, the process may determine whether the change in torque is greater than the predetermined threshold value via the processor 110. If the change in torque is greater than the predetermined threshold value, the processor 110 may deduce that the mass of the vehicle has suddenly dropped. A sudden drop in the mass of the vehicle may indicate that a passenger and/or an object has separated from the vehicle. If the change in torque is equal to the predetermined threshold value, the processor 110 may also deduce that the mass of the vehicle has suddenly dropped. The process may then continue with block 316. If the change in torque is less than the predetermined threshold value, the process may return in block 318. Once the process returns, the process may restart at block 300.

In block 316, the process may alert the driver. The processor 110 may communicate with an alerting device 112 to alert the driver or operator of the vehicle if the change in torque is greater than the predetermined threshold value. In some embodiments, the alerting device 112 may provide a visual alert. In some embodiments, the alerting device 112 may provide an audible alert. In some embodiments, the alerting device 112 may provide a haptic alert. The process may then return in block 318. Once the process returns, the process may restart at block 300.

Figure 4:
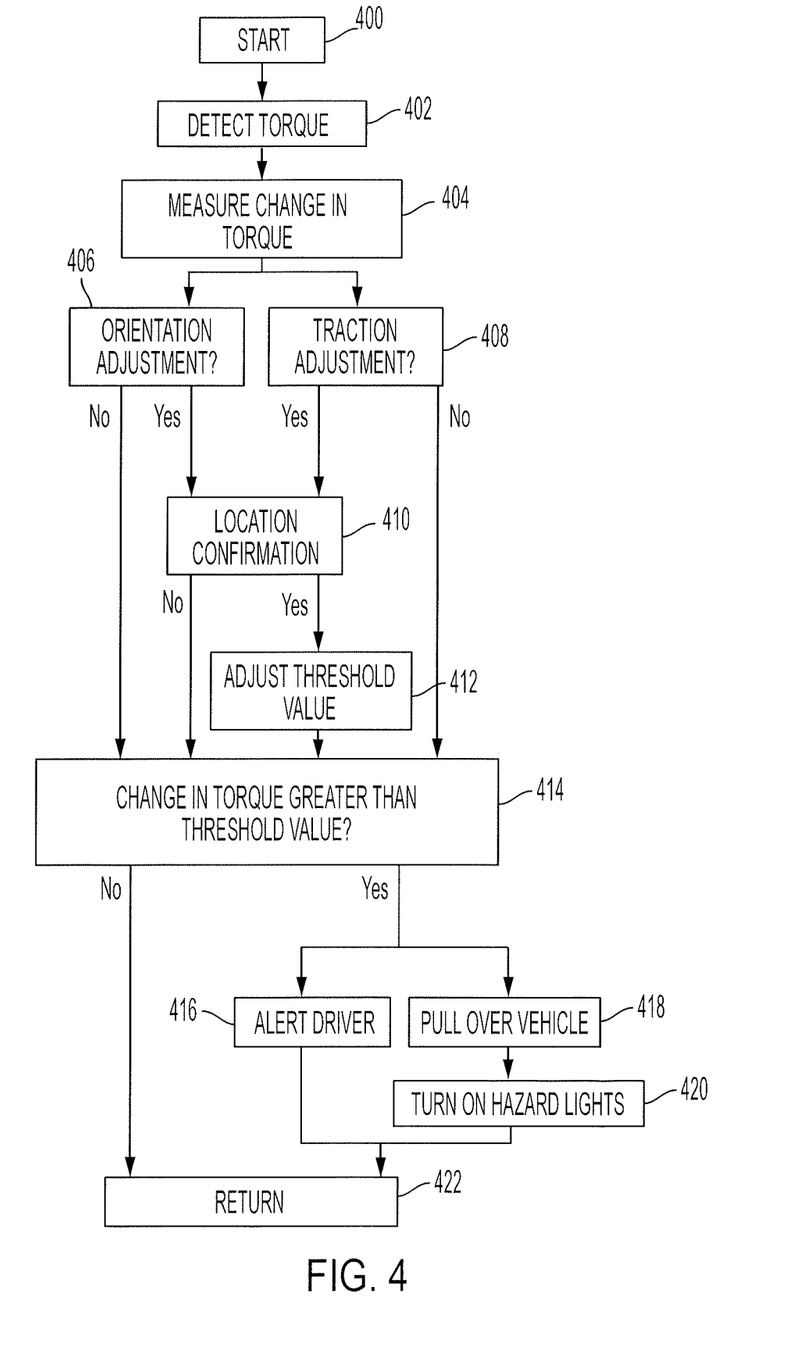
FIG. 4 illustrates a flow chart of a method for detecting and alerting a driver of a vehicle, and safely pulling over the vehicle, if a load has separated from the moving vehicle according to an aspect of the present disclosure.

FIG. 4 illustrates a flow chart of a method or process for detecting and alerting a driver of a vehicle, and safely pulling over the vehicle, if a load has separated from the moving vehicle according to an aspect of the present disclosure. The process may be performed with the system 200 of FIG. 2. Steps of the process may be similar to that of FIG. 3 except, in addition to alerting the driver in block 416, the process may also pull over the vehicle in block 418 and turn on hazard lights in block 420. Otherwise, blocks 300, 302, 304, 306, 308, 310, 312, 314, 316, and 318 of the process illustrated in FIG. 3 may translate to blocks 400, 402, 404, 406, 408, 410, 412, 414, 416, and 422 of FIG. 4, respectively. The process may alert the driver at the same time it initiates pulling over the vehicle. In some embodiments, the alert may precede pulling over the vehicle. In some embodiments, there may be a first alert that a load has separated from the vehicle and a second alert that the vehicle will pull over.

In block 418, the process may pull over the vehicle when the change in torque exceeds a predetermined threshold value in autonomous and semi-autonomous vehicles. In some embodiments, the predetermined threshold values for pulling over the vehicle may be greater than the predetermined threshold values for solely alerting the driver as in the process of FIG. 3. By pulling over the vehicle, the process may ensure safety of the passengers if the driver is incapacitated to do so or allow the driver to have an opportunity to safely inspect the passengers and the vehicle. In block 420, the process may automatically turn on hazard lights 226 to ensure further safety.

Referring back to block 418, the process may utilize a steering control unit 222 and a speed control unit 224 to pull the vehicle over safely when a triggering separation occurs. A variety of sensors, including a camera, a radar, and a lidar working together may provide the processor 210 with information on the surroundings of the vehicle, such as speed, distance, and shape of nearby objects. The processor 210 may analyze the information and communicate with the steering control unit 222 and the speed control unit 224 to pull over the vehicle when it is safe to do so. Through the sensors that sense the surroundings of the vehicle, the processor 210 may determine whether it is safer to pull over to the right or the left. The steering control unit 222 may have a second pinion connected to a rack and pinion steering system of the drivetrain 206 actuated by a servo motor controlled by the processor 210 that steers the vehicle when self-driving is desired. In pulling over and coming to a full stop to park the vehicle on the side of the road, the processor 210 may communicate with the speed control unit 224 upon processing information from the surrounding sensing sensors. The speed control unit 224 may then communicate with the torque source 204 and the brakes to reduce and eventually cut speed. The speed control unit 224 may be an adaptive cruise control (ACC) system. The ACC may react to vehicles around the vehicle and change speed when safety dictates until the vehicle is pulled over and comes to a full stop. After the vehicle is pulled over and the hazard lights are turned on, the process may return in block 422.

Figure 5:
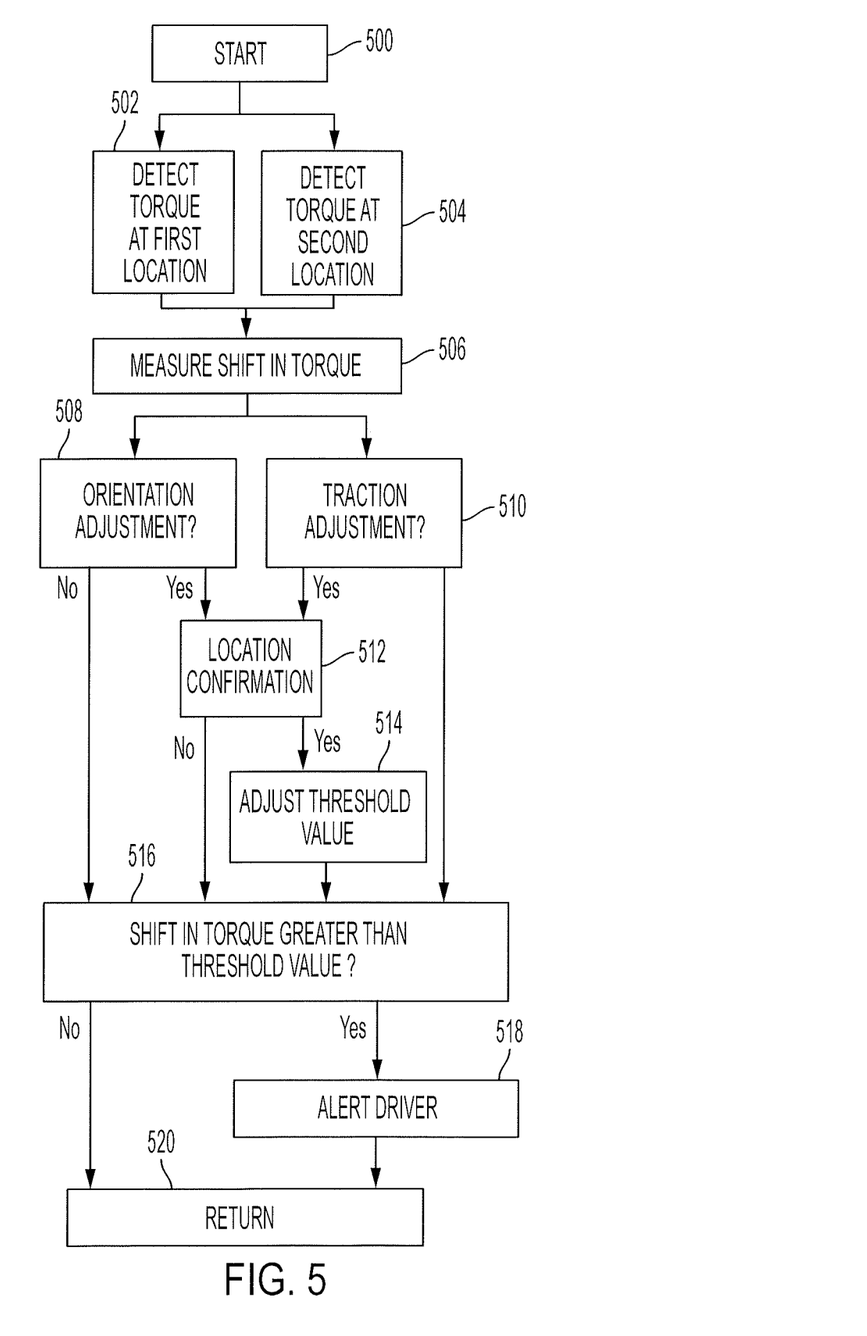
FIG. 5 illustrates a flow chart of a method for detecting and alerting a driver of a vehicle if a load has moved unwantedly in or on the moving vehicle according to an aspect of the present disclosure.

FIG. 5 illustrates a flow chart of a method for detecting and alerting a driver of a vehicle if a load has moved unwantedly in or on the moving vehicle according to an aspect of the present disclosure. The process may be performed with the system 100 of FIG. 1. Steps of the process may be similar to that of FIG. 3 except torque may be detected at least at a first location and a second location, respectively, instead of at least one location as in block 302 of FIG. 3 and the process may measure a shift in torque and determine whether the shift in torque is greater than a predetermined threshold value as opposed to doing the same for a change in torque. Otherwise, blocks 300, 304, 306, 308, 310, 312, 316, and 318 of the process illustrated in FIG. 3 may translate to blocks 500, 506, 508, 510, 512, 514, 518, and 520 of FIG. 5, respectively.

In block 502, the process may detect torque at a first location at the drivetrain 106 via one or more torque sensors 108. The first location may be a front axle or a rear axle of the drivetrain 106. In block 504, the process may detect torque at a second location at the drivetrain 106 via one or more torque sensors 108. The second location may be the one of the front axle and the rear axle that is not the first location.

In block 506, the process may measure a shift in torque between the first location and the second location. The shift in torque readings at the drivetrain 106 between the torque sensors 108 at the front axle and the rear axle may be directly proportional to a change in load mass distribution on the vehicle. In block 516, the process may determine whether the shift in torque is greater than a predetermined threshold value. The predetermined threshold value may be determined such that shifts in torque due to factors other than a passenger or an object coming loose do not continue the process with alerting the driver in block 518 but instead return the process in block 520. The predetermined threshold value may be set using the same methodology as setting a predetermined threshold value for separation previously explained in discussing FIG. 1.

Figure 6:
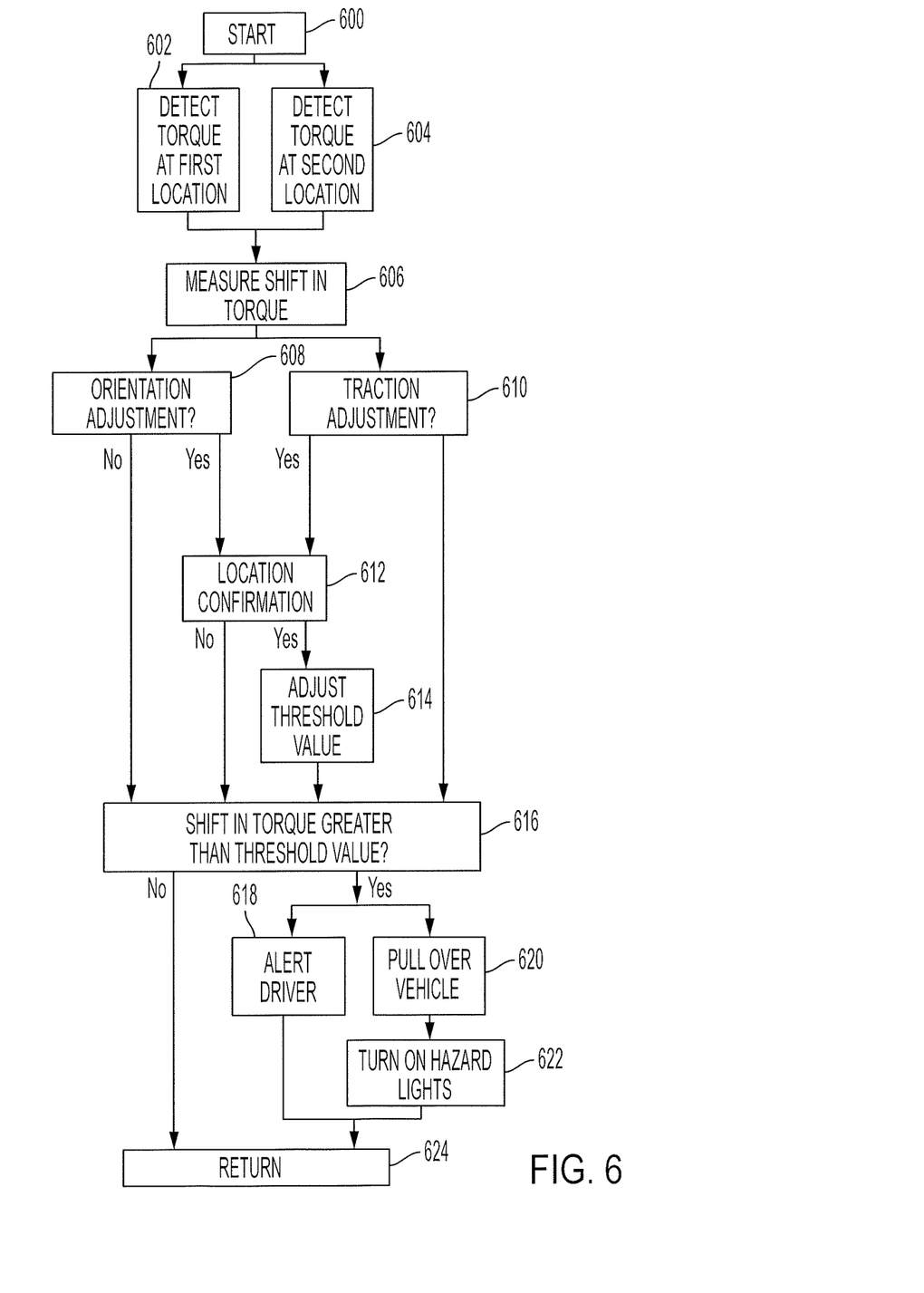
FIG. 6 illustrates a flow chart of a method for detecting and alerting a driver of a vehicle, and safely pulling over the vehicle, if a load has moved unwantedly in or on the moving vehicle according to an aspect of the present disclosure.

FIG. 6 illustrates a flow chart of a method for detecting and alerting a driver of a vehicle, and safely pulling over the vehicle, if a load has moved unwantedly in or on the moving vehicle according to an aspect of the present disclosure. The process may be performed with the system 200 of FIG. 2. Steps of the process may be similar to that of FIG. 4 except torque may be detected at least at a first location and a second location, respectively, instead of at least one location as in block 402 of FIG. 4, and the process may measure a shift in torque and determine whether the shift in torque is greater than a predetermined threshold value as opposed to doing the same for a change in torque. Otherwise, blocks 400, 404, 406, 408, 410, 412, 416, 418, 420, and 422 of the process illustrated in FIG. 4 may translate to blocks 600, 606, 608, 610, 612, 614, 618, 620, 622 and 624 of FIG. 6, respectively.

In block 602, the process may detect torque at a first location at the drivetrain 206 via one or more torque sensors 208. The first location may be a front axle or a rear axle of the drivetrain 206. In block 604, the process may detect torque at a second location at the drivetrain 206 via one or more torque sensors 208. The second location may be one of the front axle and the rear axle that is not the first location.

In block 606, the process may measure a shift in torque between the first location and the second location. A shift in torque readings at the drivetrain 206 between the torque sensors 208 at the front axle and the rear axle may be directly proportional to a change in load mass distribution on the vehicle. In block 616, the process may determine whether the shift in torque is greater than a predetermined threshold value. The predetermined threshold value may be determined such that shifts in torque due to factors other than a passenger or an object coming loose do not continue the process with alerting the driver in block 618 but instead return the process in block 524. The predetermined threshold value may be set using the same methodology as setting a predetermined threshold value for separation previously explained in discussing FIG. 1.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for detecting and issuing one or more safety measures if load has separated from a moving vehicle, the system comprising:
a torque sensor coupled to the vehicle and configured to detect a torque at a drivetrain of the vehicle;
a processor in electronic communication with the torque sensor, the processor configured to measure a change in torque in real-time, the change in torque being directly proportional to a change in mass of the load carried by the vehicle; and
an alerting device controlled by the processor, the alerting device configured to alert an operator of the vehicle when the change in torque exceeds a predetermined threshold value.

2. The system of claim 1 wherein the alert is a visual, audible, or haptic alert.

3. The system of claim 1 wherein the processor is further configured to control a steering and a speed of the vehicle and pull over the vehicle when the change in torque exceeds the predetermined threshold value.

4. The system of claim 3 wherein the processor is further configured to automatically turn on hazard lights of the vehicle when the vehicle is pulled over.

5. The system of claim 1 further comprising an orientation sensor in electronic communication with the processor to detect an orientation of the vehicle so that the change in torque does not exceed the predetermined threshold value due to the orientation of the vehicle.

6. The system of claim 1 further comprising a traction sensor in electronic communication with the processor to detect a traction of the vehicle so that the change in torque does not exceed the predetermined threshold value due to the traction of the vehicle.

7. The system of claim 1 further comprising an orientation sensor to detect an orientation of the vehicle and a traction sensor to detect a traction of the vehicle, the orientation sensor and the traction sensor in electronic communication with the processor so that the change in torque does not exceed the predetermined threshold value due to the orientation or the traction of the vehicle, respectively, and a location sensor in electronic communication with the processor to detect a location of the vehicle to verify the detected orientation and traction.

8. A system for detecting change of load mass and load mass distribution of a moving vehicle and issuing one or more safety measures based on the change of load mass and load mass distribution, the system comprising:
- a plurality of torque sensors distributed throughout the vehicle and configured to detect torque at a location on a drivetrain of the vehicle;
- a processor in electronic communication with the plurality of torque sensors, the processor configured to measure a change in torque in real-time and measure a shift in torque between the plurality of torque sensors in real-time, the change in torque being directly proportional to the change in load mass of the vehicle and the shift in torque between the plurality of torque sensors being directly proportional to the change in load mass distribution on the vehicle; and
- an alerting device controlled by the processor, the alerting device configured to alert an operator of the vehicle when the change in torque exceeds a first predetermined threshold value and the shift in torque between the plurality of torque sensors exceeds a second predetermined threshold value.

9. The system of claim 8 wherein the alert is a visual, audible, or haptic alert.

10. The system of claim 8 wherein the processor is further configured to control a steering and an acceleration of the vehicle and pull over the vehicle when the change in torque exceeds the first predetermined threshold value.

11. The system of claim 10 wherein the processor is further configured to automatically turn on the hazard lights of the vehicle when the vehicle is pulled over.

12. The system of claim 8 further comprising an orientation sensor in electronic communication with the processor to detect an orientation of the vehicle so that the change in torque does not exceed the first predetermined threshold value or the shift in torque does not exceed the second predetermined threshold value due to the orientation of the vehicle.

13. The system of claim 8 further comprising a traction sensor in electronic communication with the processor to detect a traction of the vehicle so that the change in torque does not exceed the first predetermined threshold value or the shift in torque does not exceed the second predetermined threshold value due to the traction of the vehicle.

14. The system of claim 8 further comprising an orientation sensor to detect an orientation of the vehicle and a traction sensor to detect a traction of the vehicle, the orientation sensor and the traction sensor in electronic communication with the processor so that the change in torque does not exceed the first predetermined threshold value or the shift in torque does not exceed the second predetermined threshold due to the orientation or the traction of the vehicle, respectively, and a location sensor in electronic communication with the processor to detect a location of the vehicle to verify the detected orientation and traction.

15. The system of claim 8 wherein the plurality of torque sensors includes a first torque sensor located on a front axle of the vehicle and a second torque sensor located on a rear axle of the vehicle.

16. A method for detecting and issuing one or more safety measures if a passenger or an object has separated from a moving vehicle, the method comprising:
- detecting a torque at a drivetrain of the vehicle via a torque sensor at one or more locations;
- measuring a change in torque in real-time via a processor in electronic communication with one or more torque sensors, the change in torque being directly proportional to a change in mass of load carried by the vehicle; and
- alerting an operator of the vehicle when the change in torque exceeds a predetermined threshold value via an alerting device controlled by the processor.

17. The method of claim 16 wherein the predetermined threshold value accounts for mass of consumables and rate of consumption of the consumables by the vehicle to not issue an alert due to change of torque based on consumable consumption.

18. The method of claim 16 wherein the alert is a visual, audible, or haptic alert.

19. The method of claim 16 further comprising pulling over the vehicle when the change in torque exceeds the predetermined threshold value via the processor further configured to control a steering and an acceleration of the vehicle.

20. The method of claim 19 further comprising automatically turning on hazard lights of the vehicle when the vehicle is pulled over via the processor.

* * * * *